(12) United States Patent
Verdon

(10) Patent No.: US 8,761,750 B2
(45) Date of Patent: Jun. 24, 2014

(54) METHOD AND SYSTEM FOR COMMUNICATING BETWEEN USERS

(75) Inventor: Patrick Verdon, Copenhagen (DK)

(73) Assignee: Vodafone Group Services Limited, Newbury, Berkshire (GB)

(*) Notice: Subject to any disclaimer, the term of this patent is extended or adjusted under 35 U.S.C. 154(b) by 355 days.

(21) Appl. No.: 12/737,305

(22) PCT Filed: Jul. 6, 2009

(86) PCT No.: PCT/GB2009/050793
§ 371 (c)(1),
(2), (4) Date: Oct. 21, 2011

(87) PCT Pub. No.: WO2010/001182
PCT Pub. Date: Jan. 7, 2010

(65) Prior Publication Data
US 2012/0028623 A1 Feb. 2, 2012

(30) Foreign Application Priority Data
Jul. 4, 2008 (GB) .................................. 0812249.1

(51) Int. Cl.
*H04M 3/00* (2006.01)
*H04L 29/08* (2006.01)
*G06Q 30/02* (2012.01)
*H04W 4/02* (2009.01)
*H04W 4/20* (2009.01)
*H04M 7/00* (2006.01)

(52) U.S. Cl.
CPC ............ *H04L 67/1095* (2013.01); *H04L 67/18* (2013.01); *H04M 2203/655* (2013.01); *G06Q 30/02* (2013.01); *H04W 4/023* (2013.01); *H04W 4/20* (2013.01); *H04W 4/02* (2013.01); *H04M 7/0036* (2013.01); *H04L 67/24* (2013.01)

USPC ........................................................ 455/418

(58) Field of Classification Search
USPC ........................... 455/418, 556.1, 566, 414.1
See application file for complete search history.

(56) References Cited

U.S. PATENT DOCUMENTS

| 2006/0218225 | A1* | 9/2006 | Hee Voon et al. | 709/201 |
| 2007/0255807 | A1 | 11/2007 | Hayashi et al. | |
| 2007/0281607 | A1* | 12/2007 | Bucher et al. | 455/3.06 |
| 2008/0065701 | A1* | 3/2008 | Lindstrom et al. | 707/201 |
| 2008/0162260 | A1* | 7/2008 | Rohan et al. | 705/10 |

FOREIGN PATENT DOCUMENTS

| WO | WO 2004/038622 A1 | 5/2004 |
| WO | WO 2006/107143 A1 | 10/2006 |

* cited by examiner

*Primary Examiner* — Kwasi Karikari
(74) *Attorney, Agent, or Firm* — Muirhead and Saturnelli, LLC

(57) ABSTRACT

A social networking system comprises a mobile telephone device relating to a first user, that facilitates telephone calls between the first user and other users. User data including identity data and contact data of the other users is initially resident upon the mobile telephone device. The mobile telephone device comprises a resident client application, a social network server and a network providing communication between the mobile telephone device and the social network server. User data is obtained from the device and transmitted to the social network server. The social network server analyzes the user data to identify which other users are also users of the social network server and to form a social network group accordingly and to receive update data relating to any user of the group. The social network server further selects the update data and transmits it to the client application for presentation to the first user.

27 Claims, 7 Drawing Sheets

METHOD AND SYSTEM FOR COMMUNICATING BETWEEN USERS

TECHNICAL FIELD

This application relates to a method and system of communicating between users, in particular in relation to social networking using a mobile telephone device and a social network server.

BACKGROUND TO THE INVENTION

In recent years there have been particularly rapid advances in the fields of mobile telephone communications and in communications between users implemented by computer systems. It is now commonplace for people, particularly in industrialised nations, to own a mobile telephone device which they typically keep about their person and use frequently as a primary means of voice communication with remotely positioned "contacts" such as family, friends, work colleagues and other acquaintances. Mobile telephone device handsets have been developed which provide increasing functionality and features whereby a person no longer is required to remember the telephone number and other details of their contacts since these are stored in an onboard phonebook (also referred to as an addressbook). An example such additional functionality of mobile telephone devices in recent years has been the provision of other services such as "text messaging" using the short message service (SMS) and also "web-enabled" features provided by devices equipped with mobile internet capability. Nevertheless, for most users the primary function of such mobile telephone devices is in the making and receiving of voice calls, primarily with contacts whose details are held in their phonebook onboard the mobile telephone device.

In parallel with these developments there have been rapid advances in the provision of connectivity between computers throughout the world and this in turn has increased the connectivity possible between people. It is now commonplace, in the industrialised world at least, for people to have access to personal computers at home and in the workplace, each of which are connectable to the Internet and allow communication between remote users by means such as email.

Relatively recently, a new phenomenon has emerged whereby users interact with one another through a web-enabled site to which each person has access and has registered an "account", part of which is typically a "profile" of that person, giving information about them which is visible to others. Such a website allows users to share information including text, sound files, images and other data. The use of such websites including Facebook and MySpace has given rise to the concept of "online social networking".

One practical disadvantage of these developments is that the electronic "presence" of a particular user may be distributed across a number of different online and electronic services and there is a tendency for a proliferation of connectivity which can be difficult to manage by the user. Furthermore, since there is no single system used by all, due to the organic growth of such services, users are required to access individual services independently. A further issue is that whilst in general people do experience a high degree of accessibility via laptop and desktop computers, unlike mobile telephones, these are typically not close to hand at all times. Indeed a person may use different computers at different times of the day whereas typically a single mobile telephone device is used regardless of the time of day. There is therefore a need to provide enhanced access and interactivity with the contacts of any particular user through electronic means and it is in this context in which the present invention has arisen.

SUMMARY OF THE INVENTION

In accordance with a first aspect of the system described herein, a method of social networking using a mobile telephone device and a social network server, is provided, the mobile telephone device being adapted in use to facilitate telephone calls between a first user of the device and other users, wherein user data including identity data and contact data of the other users is initially resident upon the mobile telephone device, the method comprising:

a) installing a client application upon a mobile telephone device of the first user;
b) obtaining the user data from the device and transmitting the user data to the social network server;
c) analysing the user data to identify which other users are also users of the social network server, so as to form a social network group;
d) following the receipt of update data relating to any other user of the group, selecting the update data obtained from the other users and transmitting the selected update data to the client application of the mobile telephone device; and,
e) presenting the selected update data to the first user upon the mobile telephone device.

The present applicants have realised that the list of contacts within a mobile telephone device of a user such as their mobile telephone handset provides an important distinction with respect to other lists of contacts available on email systems and other social networking websites. It is the contacts within the phone book of a mobile telephone device which represent the people who have the closest social links to the user of the mobile telephone in terms of relationships, family ties and working relationships.

Thus the system described herein tackles the problem of effectively distinguishing between contacts in a wider social network containing a large number of users all of whom are acquaintances of some type with the user of the mobile telephone device. Effectively the user data held on the mobile telephone device acts as a filter to the information transmitted and received between the first user and their wider acquaintances. The system described herein also recognises that it is advantageous to focus the majority of useful information provided to and from an online social network, through a mobile telephone device since it is such a device that is typically present upon the person of a typical user at any one time. In order to provide the functionality to achieve this, a client application upon the mobile telephone device is used to provide the requisite interactivity. In step (b) the user data may be obtained wholly, or in part, by the client application, although another resident application could be used to perform this function in addition to or in place of the client application. An example of such another resident application is an onboard synchronisation application.

The system described herein therefore recognises that greater interactivity with other contacts in a phonebook of a mobile telephone device can be provided whereby update data relating to information received from the other users or their respective mobile telephone devices can be channelled and filtered through the social network server. Thus typically the update data for a particular user is originated by that respective user. This might occur for example by the user passing information concerning themselves to the social network server, this then being passed, in accordance with preferences set, to one or more other users within their social network group. Such an update may be provided by each other user amending details upon the social network server directly, for example via a personal computer connected to the Internet, or, preferably by the use of a client application resident upon that particular user's mobile telephone device. Whilst the concept of a social network based upon a social network group provides advantages in limiting the information provided to users to that which is arguably the most important to them, it is desirable to be able to obtain additional information relating to the users, typically those users within the defined social network group, from other sources such as third party information servers via the Internet. For example such servers may include the Facebook, MySpace, Flickr, Twitter, online dating services, and so on.

Whilst the provision of a social network group provides the primary filtering of the relevant information, preferably the method allows updated information (data) relating to the first user to be provided to the social network server and then this being selected prior to provision of the update data to one or more other users within the social network group. As to what information is provided by each user and indeed what information is received by each user, this may be set in preferences stored on the social network server, or indeed at the respective client application resident upon the mobile telephone devices.

It is important here to note that a mobile telephone device in the context of the invention is one which is a portable handheld device which is used for the making of voice calls to other users at remote locations. Such devices are portable and handheld and therefore include mobile telephone handsets and personal digital assistants (PDAs) but exclude larger devices such as laptop computers regardless of whether such computers are provided with the capability of using voice over IP technology. Typically therefore the mobile telephone device is one which provides for voice calls via a mobile telephone network. In most cases such a network is a terrestrial network comprising a number of base stations having associated cells. It is envisaged however that this might include direct satellite to handset communications using low earth orbit satellites.

Whilst the social network group may be defined effectively automatically, the selection of users forming the social network group is preferably controllable by at least the first user.

The amount of information passing to and from mobile telephone devices may be controlled carefully particularly in terms of volume and therefore preferably when the update data for a particular user is obtained, it is compared with information already held by the social network server and any changes to the data are provided to other users. This may be achieved using the concept of data "deltas".

As a further mechanism by which network traffic is reduced, preferably the client application upon the mobile telephone device of the first user contacts the social network server at regular intervals according to a polling methodology. Typically such intervals are between minutes and hours apart. Preferably this is selectable by the user and the user may be provided with a selection of at least two such intervals. The preferred method of such communications is by using the HTTP method which allows for significant volumes of data to be transferred. However, it is particularly advantageous that the client application of the first user contacts the social network server at regular intervals and that selected update information from other users is provided from the social network server to the client application using a background SMS message system. This may be a "real time" system whereby the information is set as a SMS message as soon as it is received by the social network server.

Preferably any image data relating to the users is obtained from the social network server by the client application, wherein recently obtained image data is stored within an onboard store upon the mobile telephone device. The client application obtains the image data to display to the first user by firstly searching the onboard store for the data and in the event that the image data is not present from the store, the client then contacts the social network server and obtains the data from the server.

It will be appreciated that once the first user has become established in the mobile social network, the method further comprises subsequently repeating steps (c) and (d) at future times when the client device contacts the social networking server.

The update data itself which is provided by the user preferably comprises presence data in the form of at least one of: availability data describing the availability of the user for contacting by other users, status data including recent comments by the user regarding their life, or location data indicating the geographical location of the user.

The client application may also provide enhanced features upon the mobile telephone device itself for presentation to the user. For example preferably the client application is further adapted to indicate which of the users is member of the social network group, this typically being a subset of the number of contacts in the mobile telephone device phonebook.

There are a number of mechanisms by which the client application may be arranged to reside upon the handset of the mobile telephone device. For example the client application may be provided upon the mobile telephone device prior to the first user gaining possession of the device. Alternatively, it may be uploaded by the user, either via instigation from contact with the social network server (for example via the Internet) or from the handset itself. Therefore step (a) is typically performed by initially contacting the social network server and causing the client application to be transmitted from the social network server to the mobile telephone device.

The system described herein also extends to a computer program installable upon a mobile telephone device and comprising program code means adapted to perform a function of the client application and/or the social network server according to the first aspect of the system described herein.

In accordance with a second aspect of the system described herein a social networking system comprises at least one mobile telephone device relating to a first user, the mobile telephone device being adapted in use to facilitate telephone calls between a first user of the device and other users wherein user data including identity data and contact data of the other users is initially resident upon the mobile telephone device and wherein the mobile telephone device comprises a resident client application; a social network server, and a network providing communication between the mobile telephone device and the social network server, the system being adapted in use such that user data is obtained from the device and transmitted to the social network server; the social network server being adapted to analyse the user data to identify which other users are also users of the social network server and to form a social network group accordingly and to receive update data relating to any user of the group, whereby the social network server is further adapted to select the update data obtained from the other users and transmit the selected update data to the client application of the mobile telephone device for presentation to the first user.

The social networking system preferably comprises at least one remote computer connectable to the network for providing update information via the network. The network may comprise a wireless mobile communication network and/or the Internet. The system is preferably adapted to communicate the update data between a client application and the social network server using HTTP protocol for information provided periodically and SMS protocol for information provided at other times.

BRIEF DESCRIPTION OF THE DRAWINGS

An example of a method and system according to the present invention is now described with reference to the accompanying drawings, in which:—

DETAILED DESCRIPTION OF VARIOUS EMBODIMENTS

Figure 1:
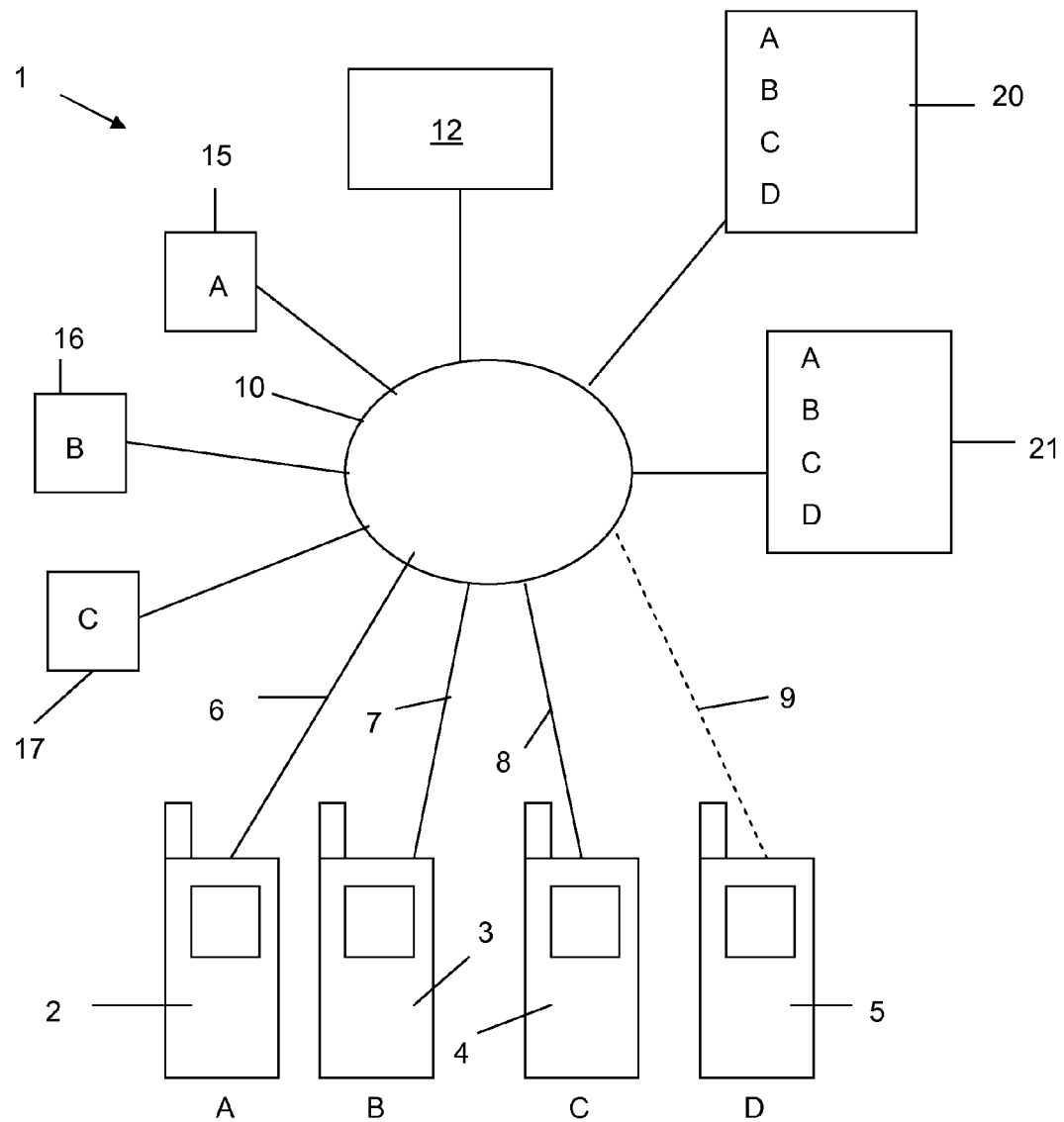
FIG. 1 is a schematic representation of the example system.

An example system for implementing the system described herein, generally indicated at 1, is now described in association with FIG. 1. Within the system 1 a number of individuals referred to as users A, B, C, D are each equipped with mobile telephones 2, 3, 4, 5 respectively. The discussion will concentrate primarily upon the activities of user A. Within this example each of users B, C, D is a friend, relative, colleague or acquaintance of user A and thus the mobile telephone numbers of each of the users B, C, D are stored as user data in the mobile telephone of user A.

As is well established in the field of mobile telephony, the user A is able to make a telephone voice call or indeed send an SMS message to any of the users B, C, D by navigating an on-screen list of users whose details are stored in the mobile phone of user A. Such communications are effected by use of a network generally indicated at 10 in FIG. 1. The network 10 provides the connectivity between each of the mobile phones 2, 3, 4, 5 and is provided by known technology such as a mobile telephone network including a number of controlled and connected distributed base stations, each having an associated "cell". The network 10 not only includes a representation of mobile telephone networks which operate via wireless communication at microwave frequencies, this also representing the connectivity of such a wireless network to a wired network, in this case the Internet. Connected to this network 10 is a computer server in the form of a social network server 12.

As illustrated in FIG. 1, the connections between the mobile telephones 2, 3, 4 are indicated by the solid lines 6, 7, 8 respectfully as providing a different kind of connection to that of the dashed line 9 from the mobile telephone 5 of user D. These lines are to indicate the relationships established between the mobile telephone devices 2, 3, 4 of the users A, B, C and the social network server 12, such a relationship notably not being established by the user D and the respective mobile telephone 5. Each of the users A, B, C is not only in possession of a mobile telephone device, but also has access to a respective personal computer 15, 16, 17, each of these being connectable to the network 10 by known means such as via the Internet. These might be located at the workplace or home addresses of the users.

The personal computers 15, 16, 17 may be operated by the respective users A, B, C to access the social network server 12 via the Internet as part of the network 10. Each of the users A, B, C, D also has a user account with a first remote server 20 and a second remote server 21. Each of the remote servers 20, 21 represents a third party service which may be joined and which allows interactivity in terms of the sharing of information between users. For example the first remote server 20 may represent a service operated by an entity such as "Facebook" and the second remote server 21 may represent another kind of third party server such as one which allows the sharing of images as is provided by an entity such as "Flickr".

It will be appreciated that the entities illustrated in FIG. 1 represent a simple schematic example for the purposes of illustrating the invention and therefore in practice there may be a large number of users which have mobile telephone devices. The example contemplates that multiple remote server services exist which are not limited to social networking or sharing applications and which may include for example email services, online dating services, user groups, and so on.

Figure 2:
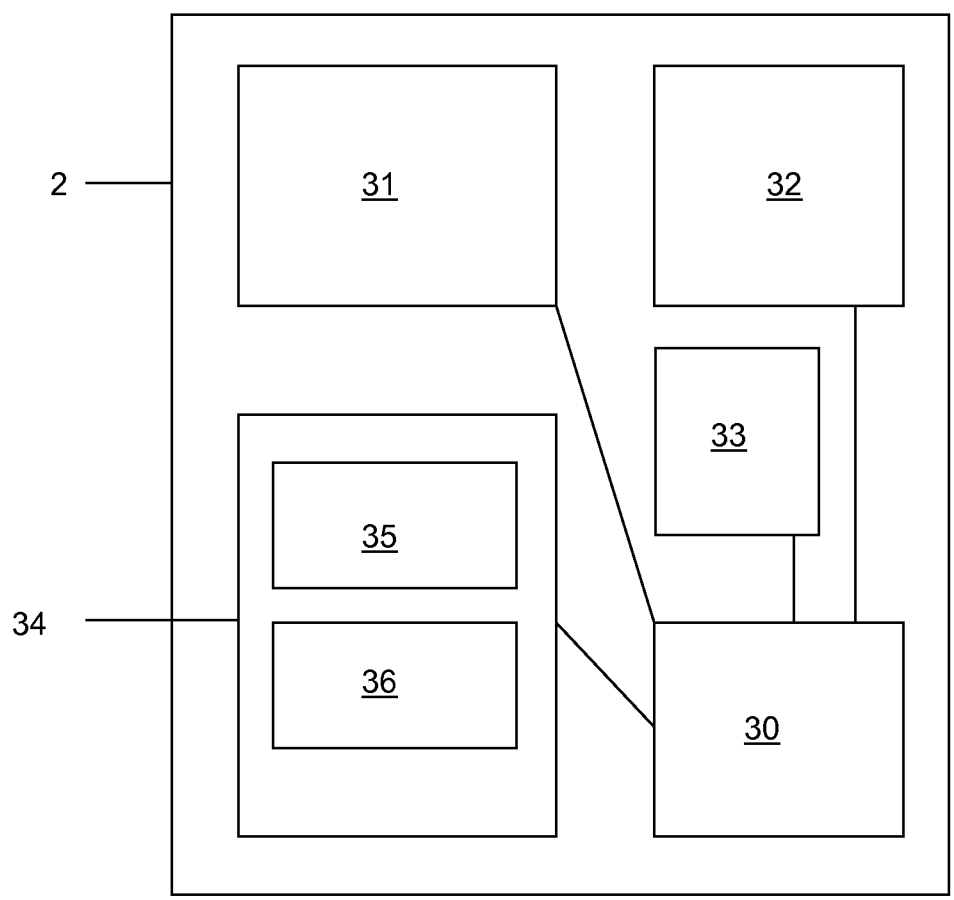
FIG. 2 shows a schematic representation of some components of a mobile telephone device according to the example system.

FIG. 2 is a schematic representation of a mobile telephone device such as device 2 of the user A in more detail. This comprises a processor 30 in communication with a display 31 input/output devices 32 such as the telephone keyboard, microphone, networking device, USB connection and so on. A GPS receiver 33 is also indicated, although this is optional since such receivers are not yet provided as standard in mobile phone handsets. Onboard memory 34 is provided, within which applications such as a client application 35 is loaded for communicating with the online social network service 12. The store 34 also includes an area for holding user data including user names such as users B, C, D and the relevant contact data (mobile telephone numbers) to enable these users to be contacted by their mobile telephone 3, 4, 5. The components shown in FIG. 2 are of course not exhaustive. Other components which are not shown include the hardware for effecting the transmission and receipt of telephone signals at microwave frequencies and so on.

Figure 3:
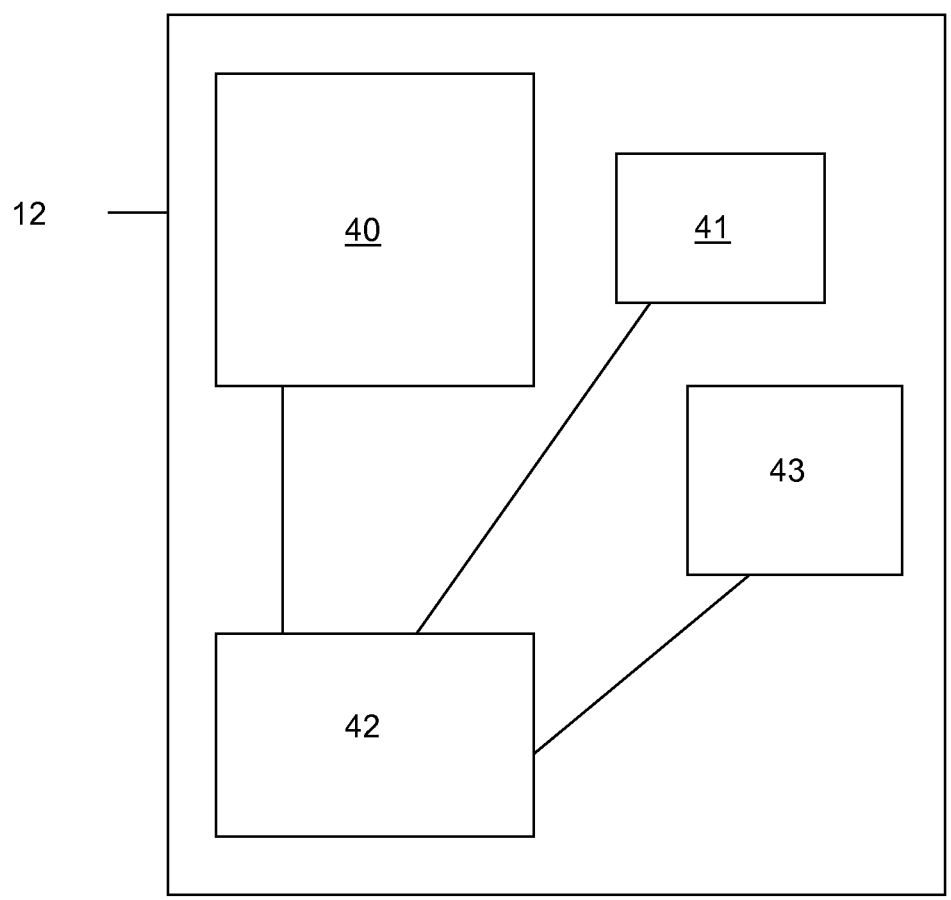
FIG. 3 shows some components of a social network server of the example system.

Turning now to FIG. 3, a schematic representation of the social network server 12 is provided. This may be implemented on many different types of computer systems including distributed computer systems. For simplicity, the server 12 is illustrated as containing a user information database 40 and memory 41 in which resides application software for operating all functions of the server 12 including receiving information and transmitting information to the personal computers and mobile devices of the users, together with communicating the remote servers 20, 21. The function of the social network server 12 is handled by a processor 42, upon which runs the application software which communicates with the network 10 via a network device interface 43. Again the components illustrated are of course not exhaustive.

It will be appreciated that the element discussed in association with FIGS. 2 and 3 are described somewhat schematically since computing devices, networking devices and mobile telephone devices are well known to persons of ordinary skill in the art.

Figure 4:
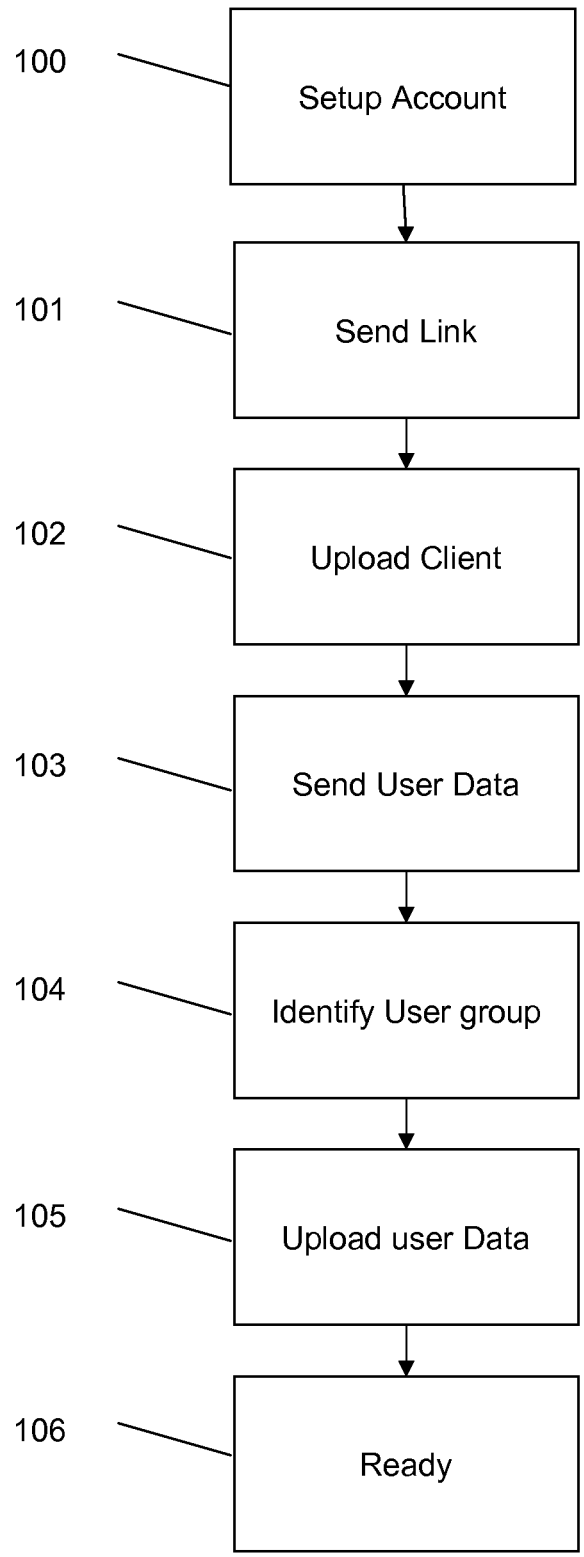
FIG. 4 is a flow diagram of the example method.

We now discuss an example of the use of the system 1 in providing a mobile telephone social networking environment in association with the flow diagram of FIG. 4. This example begins with a user A who owns a mobile telephone 2 and a home computer 15. As such, user A represents one of the many millions of people in the world who is in possession of a mobile telephone and computer. User A in this case can be thought of as for example a young professional living in a major city. User A is proficient with the use of their personal computer for various activities including the access and interaction with various websites on the Internet. Typically user A is also proficient with the use of their mobile telephone and uses this to keep in contact with other friends and relatives which may include a large number of people, these being represented by users B, C, D. This may be achieved by direct telephone conversations, SMS messages between the user A mobile device 2 and the other user mobile devices 3, 4, 5, emails between user A computer 15 and the personal computers 15, 16, 17 and a wider network of family, friends and acquaintances via services such as those represented by 20 in FIG. 1. User A may also share multimedia content such as images with their friends and relatives via use of a website such as illustrated at 21 in FIG. 1.

Even with a relatively small number of contacts (friends, relatives and other acquaintances) the use of mobile telephones, computers and social websites such as 20, 21 may generate a large amount of information as electronic data traffic which passes through the generically represented network 10. The applicants have noted that the use of services such as 20, 21 significantly enrich the experience of online life although one issue that this does raise is the distinction between a close circle of friends and relatives and those of wider friends, relatives and acquaintances whom are contacted by the user rather less often.

The system described herein recognises that a mobile telephone such as the user's mobile telephone 2 has within its onboard store 34 the identities of a subset of contacts as user data 36. This is because a mobile telephone is a device kept to hand and is primarily used for voice communication. As such, the people with whom user A speaks by telephone (or contacts by SMS) are likely to have the closest personal links with the user A and therefore be their close friends and family in particular. Thus the user data 36 on a mobile telephone provides a subset of important contacts which the present applicants have identified as a key element in setting up a social network and in distinguishing this from wider acquaintances.

The present example therefore provides a new kind of social networking wherein the most "important" contacts of the user are the focus of the network, without reducing the ability to include information, at the will of the user, from the wider social network of their contacts. It is this new social network that is overseen by the operation of the social network server 12. Another distinction between such a network and the "conventional" online social networking systems is that the selected update information relating to the activity of the network members is provided directly to the user A upon their mobile telephone 2.

At step 100 in FIG. 4 the user A elects to join the mobile social network. User A uses the personal computer 15 to access the social network server 12 via the Internet through network 10. Upon connection to the server 12 the user is able to set up a user account by entering appropriate details upon the web page presented by the server 12. Such details include the user name, contact details including their postal and email address and information concerning their mobile telephone such as the manufacturer, mobile telephone handset, the country where the telephone is registered and the mobile telephone number of the user. The details provided by user A may also include additional information concerning their birthday, workplace, relationships and a photographic image which may be presented to other users upon the system. Such additional information may be provided at a later stage during a subsequent login session with the server 12.

A validation check may then be performed at this stage by the server 12 sending a contact message to the mobile telephone 2 and awaiting a response form the user A to ensure the correct telephone is in the possession of the user.

Once this step is completed, at step 101 the social network server 12 sends an HTTP link to the mobile telephone 2 of user A via the network 10. User A then uses this link to cause the mobile telephone 2 to access the server 12 whereby an appropriate client application is selected from memory 41 upon the server 12 based upon the information provided by the user A in step 100 relating to their mobile telephone (step 102). In practice, memory 41 may comprise a mass data storage device such as a hard disc. The client application software 35 appropriate to the telephone in question is then provided to the mobile telephone 2. The client application 35 is stored upon the mobile telephone 2 in the store 34 and is then executed by the processor 42. Other methods of providing the client application 35 are also envisaged, this including a preloading of the client at a stage prior to the user A obtaining the mobile telephone, for example at the manufacturing stage at the same time as other out-of-the-box application software is loaded.

At step 103 the client application 35 accesses the user data 36 stored upon the mobile telephone device 2. We note here that user data is typically stored upon one or each of the mobile telephone memory itself and the memory of an onboard SIM card registered to the user. In the present case the client application accesses phonebook data stored in the mobile telephone memory itself, this typically comprising at least names and telephone numbers of other people known to user A. As is known, these contacts typically include family, friends and colleagues, many of which are frequent contacts of user A. Some mobile telephones also provide the ability to store other information concerning contacts within their address books, such as email addresses, birthdays and so on, or to assign contacts to subsets such as "work colleagues" or "friends". If such data is present then the client application 35 accesses this data also as part of the user data 36. Once obtained, the user data 36 is sent under the control of the processor 30 via the HTTP protocol to the server 12 over the mobile telephone network. The data 36 is provided in a format which includes a unique identifier of the mobile telephone user A, this being derived from the initial information held by the server 12 concerning the user at step 100.

At this stage the social network server 12 contains only contact information relating to user A as provided during step 100. The receipt of the user data 36 from the mobile telephone 2 and its associated unique identifier causes the server 12 to store the information concerning the users in the user information area 40, these users being associated as a user set with the user A.

At step 104 the server 12 then analyses the information within the user data 36 and for each telephone number (or user identifier) of a contact known to user A, queries the remainder of the user information 40 held by the server to determine whether any of the contacts of user A hold an account with the server 12 and is therefore already a signed up "member" of the social network service provided by the server 12. A comparison may also be made between the contacts of user A and the contacts of other members who themselves are not account holders but who are therefore known to other members. Any contacts of user A that have accounts with the server 12 are identified as a user group for user A. The social network service provided by the server 12 is primarily directed at sharing information between users of this user group, which includes user A.

Referring back to FIG. 1, the users A, B, C all hold accounts with the server 12 and therefore each of these users is a member of the user group. This is denoted by the respective solid lines 6, 7, 8. The user D, who is a contact of user A is not an account holder with the server 12 and therefore is not a member of the user group but is a member of the wider user set upon whom information is held by the server 12 as a result of the contacts of user A being communicated to the server 12 by the client application 35 upon the mobile telephone 2. This is indicated by the dashed line 9 in FIG. 1.

A confirmation step is typically provided at this point as part of step 104 since it may be important to user A to confirm that each of the identified users in the user group are known to user A and have not been identified in error. This confirmation is preferably performed by the user A accessing their account upon the server 12 using their personal computer 15. At this stage any discrepancies between the data held by the server in comparison with the user data may also be identified, such as email address information, birthday information, and so on. These can be resolved automatically for example where the data in each case contain a timestamp with the more recent data taking precedence. However a manual check can of course be performed such that the modification of the data remains under the control of the user A.

Typically each of the steps 100 to 104 is performed whilst the user A is sitting at their personal computer 15 with their mobile telephone 2 to hand. The user A interacts with server 12 using a web interface which provides all user functions relating to the service including amending account details and preferences.

The result of step 104 is that additional information concerning members of the user group is retained upon the server 12 in comparison with that upon the mobile telephone 2. This is because the server is typically provided with additional information by each user of the user group in association with their accounts upon the server which is not present within the initial contact phonebook of the mobile telephone of user A.

At step 105 the user data 36 is therefore modified to include at least some of this additional information (which may be controlled by user preferences) and this is uploaded to the mobile telephone 2 of user A. Notably this information includes data concerning whether each contact of user A also has an account with the server 12 and is therefore a member of the new user group of user A.

The service provided by the server 12 is designed to keep each user within the user group in contact by providing information about their activities directly to the respective mobile telephones of the users.

The information in question is referred to as "presence" information. This comprises the status of each user, the availability of each user and, where implemented, the location of each user.

The "status" of each user originates from that user and is typically textural information provided by the user concerning their present activities or feelings. For example, a particular user may provide status information such as "Just landed in Paris!". The server 12 obtains this information in a number of ways. Firstly the server may obtain such information by the user in question logging on to the server 12 using their personal computer and updating their status information through the relevant web page provided by the server. Alternatively, the user may provide this information to the server by entering it onto their mobile telephone, this being provided by the client application 35 to the server 12. As a further alternative, such information in some cases may be provided via a "feed" of data from a third party such as a remote server 20, 21 as shown in FIG. 1. It will be appreciated that online social networking websites provide an analogous "status" feature. Notably, the user provides the status information to either the server 12 or remote servers 20, 21 (which in turn is passed to the remote server 12) by the positive action of entering this information into the respective website or their mobile telephone in the case of information provided directly to the server 12.

"Availability" information in the present example takes the form of one of three alternative availability statuses. The first status is "available" in which case the user in question is deemed to be contactable. The second status is "busy" where the user may be within periodic contact of the server 12 via their mobile telephone, although the "busy" status indicates they are not to be contacted. The third status is an "offline" status whereby the user has either indicated that they are temporarily ceasing contact with the server or where no such contact has been received for a given time period (such as a number of hours). In the case of "location" information, in instances where a GPS receiver is provided within the mobile telephone as shown at 33 in FIG. 2, then this information may be obtainable by the client application 35 and forwarded to the server 12 to provide some indication of the location of the user.

The "presence" data is received at various times from the various respective users who are members of the social network system and therefore have accounts with the server 12. Generally, when updated presence information has been obtained from any user within a user group, this may be made available to other members of the user group subject to various preferences and settings set up by the users.

Since the initial contacts within the phonebook held by each user of the system may include people whom the user shares different degrees of trust, friendship or regularity of contact, the system allows for each user to select the amount of information that is shared with each other user and indeed the amount which is received from other users in the user group even if such information is freely provided by the other users.

For example, if user B represents the best friend of user A, then it is likely that users A and B will wish to share the maximum amount of information available with one another. On the other hand, if user C is a work colleague but not a close friend of user A, then each of users A and C may be desirous to limit the amount of information provided between them upon the mobile social network. Thus, a preference setting is provided for the user via their account such that for example user A may instruct the server 12 that user B may view all of user's A presence information including their status, availability and, if implemented, their location. User B might choose to select receipt of only the status information of user A or indeed all of the information that is made available to them by the user A. On the other hand, user C may only be provided with the availability information from user A via user A selecting an appropriate preference with respect to user C upon their account such that only the availability information is provided to them.

Whilst individual preferences may be set up against each user, a fast track method of providing full presence information between close friends can be set up by the concept of "connecting" between users within the user group. For example, a function within the web page upon server 12 may allow user A to "connect" to user B, this sending a request to user B that user A wishes to share all of their presence information with them. User B can simply confirm via their account that they agree to this and thus all information relating to the presence of users A and B may be interchanged between them. A connection request is preferably not only logged at the account of the recipient of the request but is also sent to the respective user's mobile telephone so that they are made aware that such a request is pending.

Returning now to FIG. 4, at step 105, the enhanced information relating to the user data is uploaded via the wireless mobile telephone network to the mobile telephone 2 of user A and this may include not only the additional information relating to the other users within the user group, but also the indication of whether each user is a member of the system and therefore the user group, together with, for those users, any information that is made available by those other users. Upon the initial upload, typically only some "presence" data may be provided since most users will elect to only provide the presence information to known users. Such users in the user group other than user A will become informed that user A has joined the system operated by the server 12 by an appropriate message sent to their respective mobile telephones.

At step 106, the client application 35 has received the enhanced user data and stores this upon the mobile telephone 2 of user A and therefore is ready for interaction with the mobile social network and in particular with those of the user group such as users B, C.

Contact between each of the mobile telephones 2, 3, 4 and the server 12 via network 10 is provided in this example by a "polling" method. Upon initial setup of the client application 35 at step 106, the user is provided with a choice as to whether they wish polling to occur frequently, for example at 15 minute intervals, or occasionally (every 2 hours in this case) so as to preserve battery life. Polling is performed by the client application 35 initiating an exchange of information with the server via mobile HTTP. As will be appreciated, this is a relatively data intense process and the polling ensures that the network is not jammed with network traffic.

During the normal use of the system 1, if a user makes a change to information upon their mobile telephone such as their "status" for example by entering some text into the mobile telephone under the control of the client application 35, then at the next time the polling occurs, this information will be sent to the server 12. All other members in the user group such as users B, C then receive this information (preference permitting) at the time that their mobile telephones poll the server 12.

Thus any changes in the presence information or indeed any of the other user data made by any of the users are exchanged with all of the users in the user group at the time of polling under the control of the preferences set up by the respective users.

The majority of information exchanged between the various mobile telephones and the server 12 occur as a result of polling. There are however some exceptions to this. For example in the case where the user simply wishes to update their status information, since this normally takes the form of a small amount of text to the data, this may be provided to the server 12 via an "SMS message". For example the HTTP format may also be used to provide certain information such as an update of status information, or availability immediately to the server (without waiting for polling). Another example of where information exchange does not occur under the normal polling procedure is that the mobile telephones obtain image information from the server 12. The image information may include photographic images of users together with certain icon data. Depending upon the amount of onboard memory provided, a predetermined amount of image information may be uploaded from the server for example at step 105 as part of the user data. However, since image data represents large volumes of data, the related image information may be requested by the client application in real time when the user is reviewing the information relating to particular users upon the client application 35. Thus for example when the user is scrolling through their phonebook of contacts provided by the client application 35, the client application provides enriched user data uploaded from the server at step 105 (or subsequently) and in the event that it was not possible to cache the relevant images for particular users, when the user attempts to view information concerning users for which images are not cached, then these images are uploaded in real time from the server 12. At any time therefore the client application 35 may have access to the most recent images viewed since these are held in a cache within the store 34 on the mobile telephone device 2. Thus the client application 35 may query the cache for the image of a particular user and, if this is not present, then directly contact the server 12 outside of the normal polling regime in order to obtain the relevant image.

Since the presence data in particular is likely to change significantly over time, due to the restrictions upon the memory available in mobile telephones, the mobile telephone memories in this example do not hold historical information concerning previous presence data and therefore all updates are not obtained as a function of time on the mobile telephone 2 for example. However, historical information may be retained upon the server 12 and may be viewed via web access to the server for example using personal computers such as computer 15. Therefore, if status information is received from user B via the first remote server 20, for example from a Facebook account, if this was received at 9 am then this might be scheduled to be provided to the user A at the next time user A polls the server. If this is scheduled to take place at 10.30 am, then if user B provides an update to their status information for example via their mobile telephone 3, directly to the server 12, then it is this latter information that will be provided to the user A when their mobile telephone device 2 polls the server at 10.30. Nevertheless the information received from the server 20 will be retained in a presence history available via the account of the user A accessible through their personal computer 15. It is noted that the presence data is preferably always accompanied by timestamp date provided by the respective source (such as the mobile telephone client application). This may be used to determine which information is the more current. If such a timestamp is not available (which may be the case where presence data is obtained from third party sources) then the system time of receipt may be used as the timestamp.

In order to minimise the network traffic upon the network 10, whenever any information is received from a user or a remote server, the information is compared with that held upon the server 12 and only sent on to the respective users if this represents a change in that data. The new information may be provided via the network 10 such that if some information related to a particular user is updated, then all information relating to that user may be passed across the network for example to the mobile telephone, or only the selected part which has changed may be transmitted. Furthermore, a "delta" of information may be used to minimise network traffic.

The web interface of the server which allows a user to control their account typically allows the user to set up a "profile" which may be visible on line to other users and which may represent the basis of information concerning that user that is loaded to the mobile telephones of other users in the user group. Such a profile may therefore include a photographic image of the user, information concerning their contact address, email address, mobile telephone number and presence information relating to that user, including historical presence information. As mentioned earlier, the ability of other users to view this information can be controlled by the user A and we note here that not only can information be selected in terms of its provision to other users in the group, the user A may also select whether or not they wish to be within a user group of other users known from their contact phonebook, thus allowing the user A to "opt out" of a particular group.

Although the present example contemplates the use of information received from remote servers such as 20, 21 as presence information for members within the user group, an additional function of the system may be provided such that user A may obtain status information from a user such as user D if they have a presence upon a remote server and even in the event that they are not a member of the mobile social network run upon the server 12. Such a "feed" of status information would preferably require initiation or at least confirmation by the user D even though that user may not wish to join the social network operated by server 12. User D may be known to users A and B as a contact in their respective phonebooks on their mobile telephones. The server is able to identify user D as a contact in common to users A and B even though D is not a participant in the social network system. Each of users A and B may add information relating to user D by accessing the server, preferably using their remote computers (although conceivably using their mobile telephones) and this information that is added may be communicated to all users of the system for whom user D is a contact. For example user A may add a direct link to the Facebook profile of user D, whereas user B may add information concerning user D's Flickr account. Thus a number of users (A, B and so on) may build up a profile of a user such as D who is not a member of the social network system. This profile can be inherited by user D when they choose to join the system. As an optional security feature it may be require that a number of contacts of such a user D add similar information (such as a Facebook link) before that information becomes attached to their (user D) "profile" on the system. Notably in this case no confirmation or request may be sent to user D.

Whilst the polling between the mobile telephone devices and the server 12 is the primary means of information exchanged between these devices, in some cases it may be advantageous to produce real time information such as status information. Therefore, in addition to the polling via the HTTP system, a background binary text message protocol may be used to provide certain update information such as status information. Such an alternative mechanism in addition to the polling via HTTP would provide an enhanced functionality controlled by the client application 35 with similar preference controls. A user such as user A may also be able to provide status information in a similar manner to the server 12 outside the mechanism of polling in the same way.

Figure 5:
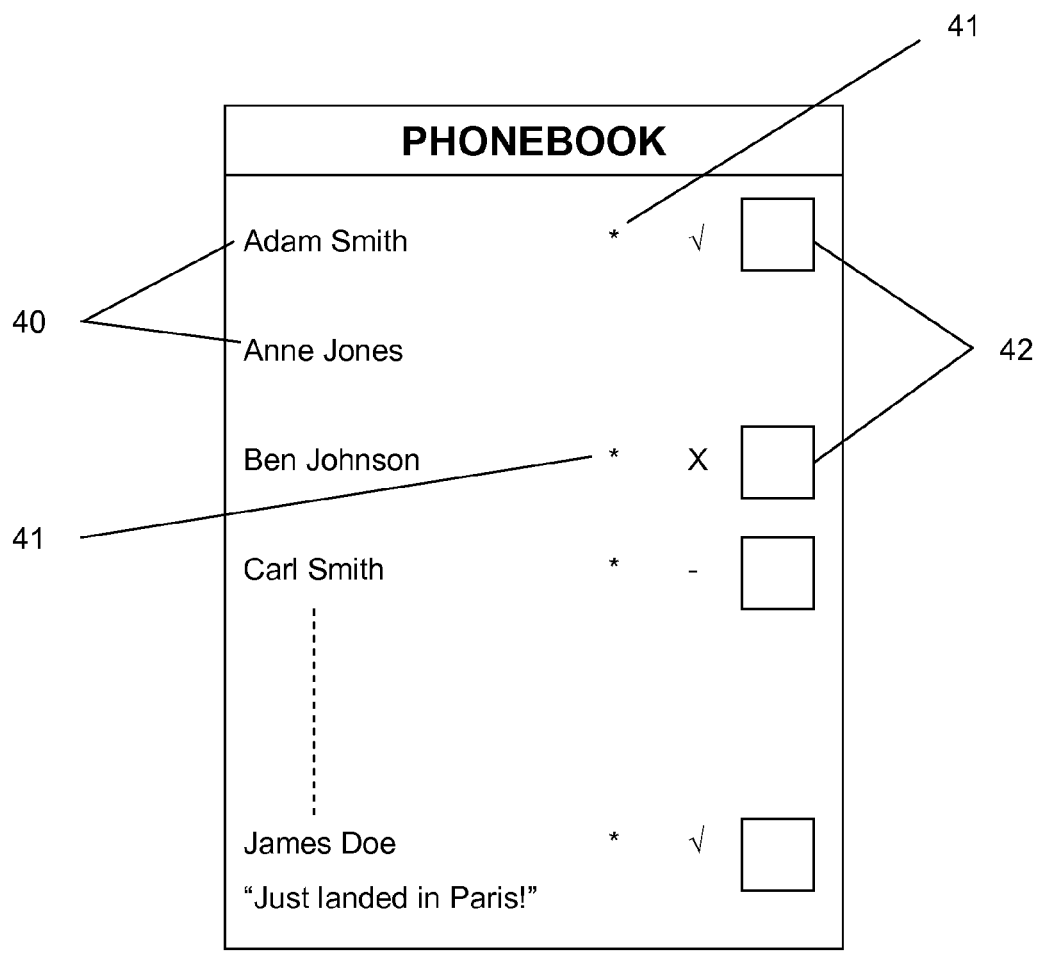
FIG. 5 is a schematic representation of a phone book viewed in accordance with the client application.

FIG. 5 provides a schematic illustration of enhanced user data accessible upon a mobile telephone 2 through the client application 35. This is presented at a "Phonebook" screen in which a number of contacts which were originally derived from the phonebook upon the mobile telephone in question are now visible with some enhanced information. The contact names are illustrated at 40. Adjacent the contact name is the presence or absence of an asterisk 41. This is an indicator of whether the contact 40 is a member of the social network provided by server 12. For example the presence of an asterisk adjacent to the name of Adam Smith indicates that Adam Smith is such a contact. The next indicator at 42 is an indicator of the availability of the contact. Therefore Adam Smith is indicated as being available (a tick), Ben Johnson is unavailable (a cross) and Carl Smith is offline (a hyphen). A small thumbnail of a photographic image of the contact is also illustrated at 42 adjacent to the names of the respective users.

In the present case, if the phonebook in FIG. 5 is illustrative of that of user A, then if user B is James Doe with whom the preferences between users A and B provide for a sharing of status information then the status may be displayed within the phonebook of FIG. 5. In this case, the last status information received from user B was "Just landed in Paris!"

The user A may also view their own profile as a specialised contact within the phone book which for example could always be present at the first entry within the phonebook.

Figure 6:
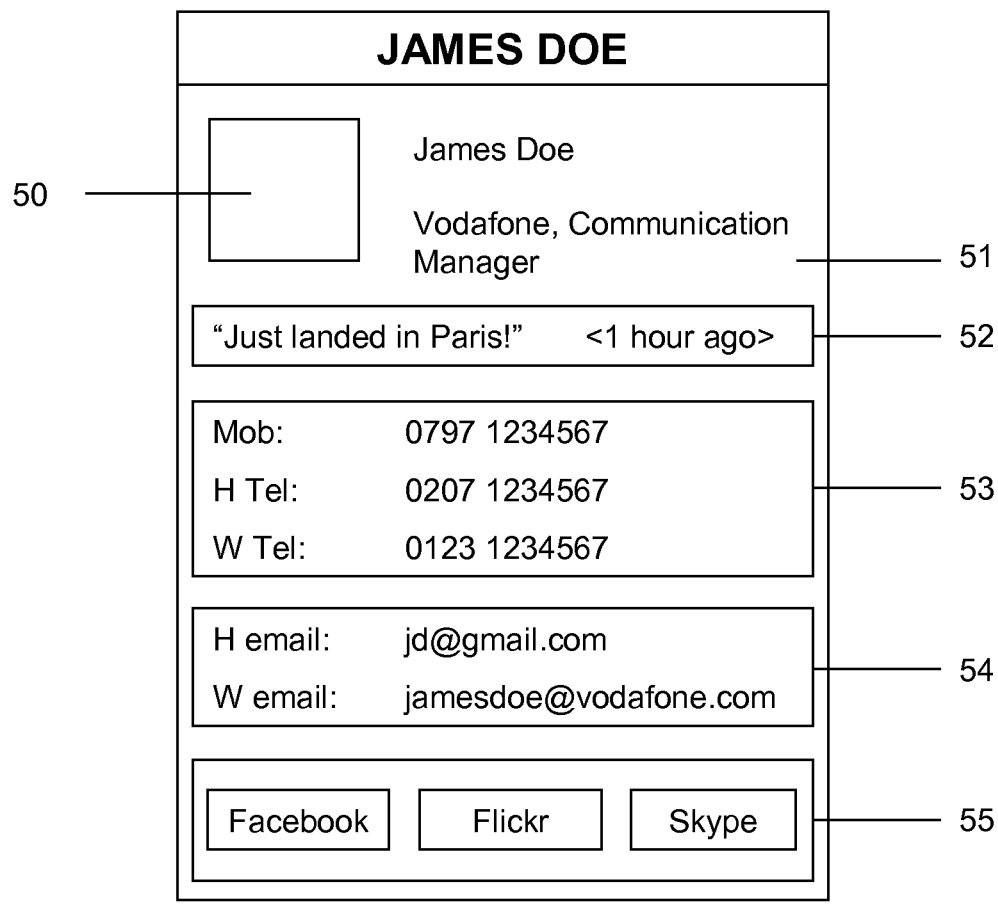
FIG. 6 is an example view of particular contact information presented by the client application; and, FIG. 7 is a schematic example of the presentation of online life information by the client application.

At a further example of the user data provided, FIG. 6 shows contact information which may be available via the client application, in this case for James Doe. In this case a picture of James Doe (user B) is shown at 50, together with his occupation at 51. At 52 the status information is also provided, together with the relevant time information. Beneath this at 53 is indicated the various telephone contact numbers for user B and under that, at 54, home and work email addresses. It will be appreciated that this information shown in FIG. 6 is merely illustrative and additional information may also be provided such as their home and work contact addresses and so on. At a part of the screen illustrated in 55, the "online life" of user B is presented, this including three icons for "Facebook", "Flickr", "Skype". The user is able to navigate to each of these icons and select them using the client application 35. This then initiates an external session with each of these various service providers so for example in the case of Facebook the mobile Internet page of James Doe upon Facebook is accessed via a link.

Figure 7:

It will be appreciated therefore that part of the user data 36 in this case relating to user B is a URL giving access to the mobile Facebook page of James Doe. Similar access is provided to Flickr and to make a Skype call using the other two icons respectively. As another example of the functionality of client application 35, an online life screen is illustrated in FIG. 7, this providing selected presence information from the contacts in the phonebook of the user A, in this case status information which has been entered in time dependent order. The latest status information from each user within the user group is listed in time dependent order with the most recent being presented at the top. A maximum time period of 1 day can be used for example to filter all the status messages and prevent them from being presented.

It will be appreciated that other functionalities may be provided such as the ability to share images, for example those available via Flickr, or ones that are loaded directly to the server 12. Commentary may be provided in relation to such shared images via other members of the user group, again controlled by respective preferences.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of social networking using a mobile telephone device and a social network server, the mobile telephone device being adapted in use to facilitate telephone calls between a first user of the device and other users, wherein user data including identity data and contact data of the other users is initially resident upon the mobile telephone device, the method comprising:

installing a client application upon a mobile telephone device of the first user;

obtaining the user data from the mobile telephone device and transmitting the user data to the social network server;

analyzing the user data to identify which other users, being identified by the identity data and the contact data, are also registered users of the social network server, so as to form a contact list-based social network group of the first user, wherein the first user is also part of a wider social network group maintained at the social network server, the contact list-based social network group being distinguished from the wider social network group;

receiving update data at the social network server relating to at least one other user that is part of the wider social network group;

following receipt of the update data of the at least one other user at the social network server, determining whether the at least one other user of the wider social network group is also part of the contact list-based social network group of the first user; and filtering, at the social network server, transmission of the update data of the at least one other user from the social network server to the mobile telephone device of the first user by transmitting the update data of the at least one other user to the mobile telephone device of the first user only when the at least one other user is also part of the contact list-based social network group of the first user.

2. The method according to claim 1, wherein the update data for the at least one other user is originated by the at least one other user.

3. The method according to claim 1, wherein the update data is processed using a location determining component of the mobile telephone device of the at least one other user.

4. The method according to claim 1, wherein selection of users forming the contact list-based social network group is controllable by at least the first user according to the identity data and the contact data transmitted in the user data to the social network server.

5. The method according to claim 1, wherein each user of the contact list-based social network group is identified by an identifier containing the mobile telephone number of the user.

6. The method according to claim 1, wherein the mobile telephone device communicates with the social network server via a wireless mobile telephone network.

7. The method according to claim 1, wherein the mobile telephone device communicates with the social network server using the HTTP protocol.

8. The method according to claim 1, wherein the update data is transmitted to the social network server as an SMS message.

9. The method according to claim 1, wherein image data relating to the at least one other user is obtained from the social network server by the client application, wherein recently obtained image data are stored within an onboard store upon the mobile telephone device, and wherein when the client application obtains the image data to display to the first user by searching the onboard store for the data and, in the event that the image data is not present from the store, contacts the social network server and obtains the image data from the server.

10. The method according to claim 1, further comprising: repeating the step of analyzing the user data at future times when the client device contacts the social networking server.

11. The method according to claim 1, wherein the update data comprises presence data in the form of at least one of: availability data describing the availability of the at least one other user for contacting, status data indicating a recent comment by the at least one other user regarding their life or location data indicating the geographical location of the at least one other user.

12. The method according to claim 1, wherein in the client application is further adapted to indicate members of the wider social network group.

13. The method according to claim 1 wherein the client application is provided upon the mobile telephone device prior to the first user gaining possession of the device.

14. The method according to claim 1, wherein the step of installing the client application is performed by initially contacting the social network server and causing the client application to be transmitted from the social network server to the mobile telephone device.

15. The method according to claim 1, further comprising:
receiving, at the client application of the mobile telephone device of the first user, the update data relating to the at least one other user of the contact list-based social network group; and
displaying on the mobile telephone device the update data.

16. The method according to claim 1, further comprising:
processing first user update data related to the first user at the client application of the mobile telephone device, wherein the update data is one of a first type of update data or a second type of update data;
transmitting the update data related to the first user to the social network server, wherein the first type of update data is transmitted to the social network server in real time, and wherein the second type of update data is transmitted at regular polling intervals when the client application of the mobile telephone device of the first user contacts the social network server;
comparing the update data received at the social network server for the first user with data already held by the social network server for the first user to identify at least one data change of the first user; and
distributing from the social network server the at least one data change of the first user to at least one other user of the social network group,
wherein, for the at least one data change of the first user being identified based on the update data being of the first type and transmitted in real time to the social network server, the at least one data change is then distributed to the at least other user outside of the regular polling intervals, and
wherein, for the at least one data change of the first user being identified based on the update data being of the second type and transmitted to the social network server according to the regular polling intervals, the at least one data change of the first user is then distributed to the at least one other user based on a time of the regular polling intervals.

17. The method according to claim 16, wherein the first user is provided with a selection of at least two intervals for the regular polling intervals when the client application contacts the social network server.

18. A social networking system, comprising:
at least one mobile telephone device relating to a first user, the mobile telephone device being adapted in use to facilitate telephone calls between a first user of the device and other users wherein user data including identity data and contact data of the other users is initially resident upon the mobile telephone device, and wherein the mobile telephone device comprises a resident client application;

a social network server, wherein communication between the mobile telephone device and the social network server is provided using a network, the system being adapted to:
- obtain the user data from the mobile telephone device and transmit the user data to the social network server;
- analyze the user data to identify which other users, being identified by the identity data and the contact data, are also registered users of the social network server, so as to form a contact list-based social network group of the first user, wherein the first user is also part of a wider social network group maintained at the social network server, the contact list-based social network group being distinguished from the wider social network group;
- receive update data at the social network server relating to at least one other user that is part of the wider social network group;
- following receipt of the update data of the at least one other user at the social network server, determining whether the at least one other user of the wider social network group is also part of the contact list-based social network group of the first user; and
- filter, at the social network server, transmission of the update data of the at least one other user from the social network server to the mobile telephone device of the first user by transmitting the update data of the at least one other user to the mobile telephone device of the first user only when the at least one other user is also part of the contact list-based social network group of the first user.

19. The social networking system according to claim 18, further comprising:
- at least one remote computer connectable to the network for providing information for the update data via the network.

20. The social networking system according to claim 18, wherein the network comprises a wireless mobile communication network.

21. The social networking system according to claim 20, wherein the network comprises the Internet.

22. The social networking system according to claim 18, wherein the system is further adapted to:
- receive, at the client application of the mobile telephone device of the first user, the update data relating to the at least one other user of the contact list-based social network group; and
- display on the mobile telephone device the update data.

23. The social networking system according to claim 18, wherein the system is further adapted to:
- process update data related to the first user at the client application of the mobile telephone device, wherein the update data is one of a first type of update data or a second type of update data;
- transmit the update data to the social network server, wherein the first type of update data is transmitted to the social network server in real time, and wherein the second type of update data is transmitted at regular polling intervals when the client application of the mobile telephone device of the first user contacts the social network server;
- compare the update data received at the social network server for the first user with data already held by the social network server for the first user to identify at least one data change; and
- distribute from the social network server the at least one data change of the first user to at least one other user of the social network group,
- wherein, for the at least one data change of the first user being identified based on the update data being of the first type and transmitted in real time to the social network server, the at least one data change is then distributed to the at least other user outside of the regular polling intervals, and
- wherein, for the at least one data change of the first user being identified based on the update data being of the second type and transmitted to the social network server according to the regular polling intervals, the at least one data change of the first user is then distributed to the at least one other user based on a time of the regular polling intervals.

24. The social networking system according to claim 23, wherein the system is adapted to communicate the update data between the client application and the social network server using HTTP protocol for the second type of update data provided at the regular polling intervals and SMS protocol for the first type of update data provided in real time.

25. A non-transitory computer readable medium storing software for providing social networking using a mobile telephone device and a social network server, the mobile telephone device being adapted in use to facilitate telephone calls between a first user of the device and other users, wherein user data including identity data and contact data of the other users is initially resident upon the mobile telephone device, the software comprising:
- executable code that installs a client application upon a mobile telephone device of the first user;
- executable code that obtains the user data from the mobile telephone device and transmits the user data to the social network server;
- executable code that analyzes the user data to identify which other users, being identified by the identity data and the contact data, are also registered users of the social network server, so as to form a contact list-based social network group of the first user, wherein the first user is also part of a wider social network group maintained at the social network server, the contact list-based social network group being distinguished from the wider social network group;
- executable code that receives update data at the social network server relating to at least one other user that is part of the wider social network group;
- executable code that, following receipt of the update data of the at least one other user at the social network server, determines whether the at least one other user of the wider social network group is also part of the contact list-based social network group of the first user; and
- executable code that filters, at the social network server, transmission of the update data of the at least one other user from the social network server to the mobile telephone device of the first user by transmitting the update data of the at least one other user to the mobile telephone device of the first user only when the at least one other user is also part of the contact list-based social network group of the first user.

26. The non-transitory computer readable medium according to claim 25, wherein the software further comprises:
- executable code that receives, at the client application of the mobile telephone device of the first user, the update data relating to at least one other user of the contact list-based social network group;

executable code that displays on the mobile telephone device the user update data.

27. The non-transitory computer readable medium according to claim 25, wherein the software further comprises:

executable code that processes update data related to the first user at the client application of the mobile telephone device, wherein the update data is one of a first type of update data or a second type of update data;

executable code that transmits the update data to the social network server, wherein the first type of update data is transmitted to the social network server in real time, and wherein the second type of update data is transmitted at regular polling intervals when the client application of the mobile telephone device of the first user contacts the social network server;

executable code that compares the update data received at the social network server for the first user with data already held by the social network server for the first user to identify at least one data change; and executable code that distributes from the social network server the at least one data change of the first user to at least one other user of the social network group, wherein, for the at least one data change of the first user being identified based on the update data being of the first type and transmitted in real time to the social network server, the at least one data change is then distributed to the at least other user outside of the regular polling intervals, and wherein, for the at least one data change of the first user being identified based on the update data being of the second type and transmitted to the social network server according to the regular polling intervals, the at least one data change of the first user is then distributed to the at least one other user based on a time of the regular polling intervals.

* * * * *